United States Patent
Xu et al.

(10) Patent No.: US 12,082,100 B2
(45) Date of Patent: Sep. 3, 2024

(54) NETWORK SELECTION METHOD, NETWORK DEVICE, AND TERMINAL DEVICE

(71) Applicant: Huawei Technologies Co., Ltd., Shenzhen (CN)

(72) Inventors: Bin Xu, Beijing (CN); Bingzhao Li, Beijing (CN); Lei Chen, Beijing (CN); Zhenzhen Cao, Beijing (CN); Xuelong Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 355 days.

(21) Appl. No.: 17/400,753

(22) Filed: Aug. 12, 2021

(65) Prior Publication Data

US 2021/0377849 A1 Dec. 2, 2021

Related U.S. Application Data

(63) Continuation of application No. PCT/CN2020/074253, filed on Feb. 4, 2020.

(30) Foreign Application Priority Data

Feb. 14, 2019 (CN) .................. 201910115471.X

(51) Int. Cl.
*H04W 76/34* (2018.01)
*H04W 24/10* (2009.01)
(Continued)

(52) U.S. Cl.
CPC ........... *H04W 48/18* (2013.01); *H04W 24/10* (2013.01); *H04W 36/08* (2013.01); *H04W 76/30* (2018.02); *H04W 84/042* (2013.01)

(58) Field of Classification Search
CPC ..... H04W 48/18; H04W 24/10; H04W 36/08; H04W 76/30; H04W 84/042; H04W 76/34; H04W 36/30
See application file for complete search history.

(56) References Cited

U.S. PATENT DOCUMENTS

| 2009/0239533 A1* | 9/2009 | Somasundaram .... H04W 48/16 455/434 |
| 2014/0094188 A1* | 4/2014 | Kazmi ................. H04W 4/023 455/456.1 |

(Continued)

FOREIGN PATENT DOCUMENTS

| CN | 102075983 A | 5/2011 |
| CN | 107079318 A | 8/2017 |

(Continued)

OTHER PUBLICATIONS

3GPP TSG-RAN2 meeting#105, R2-1901469 Title: Consideration on connection to 5gc for NB-IoT (Year: 2019).*

(Continued)

*Primary Examiner* — Christopher M Crutchfield
*Assistant Examiner* — Abusayeed M Haque
(74) *Attorney, Agent, or Firm* — Slater Matsil, LLP

(57) ABSTRACT

This application provides a network selection method, a network device, and a terminal device. The network selection method mainly includes: A first network device sends a first message to a terminal device. The first message includes a message that indicates the terminal device to measure a cell of a first-type network, the first-type network is a high-priority network selectable for the terminal device, and a network provided by the first network device does not belong to the first-type network.

20 Claims, 5 Drawing Sheets

(51) Int. Cl.
  *H04W 36/08*  (2009.01)
  *H04W 36/32*  (2009.01)
  *H04W 48/18*  (2009.01)
  *H04W 76/30*  (2018.01)
  *H04W 84/04*  (2009.01)

(56) References Cited

U.S. PATENT DOCUMENTS

| | | | | |
|---|---|---|---|---|
| 2014/0198640 A1* | 7/2014 | Suzuki | ........... | H04W 48/18 |
| | | | | 370/230 |
| 2015/0011236 A1* | 1/2015 | Kazmi | ........... | H04W 52/365 |
| | | | | 455/456.1 |
| 2015/0153395 A1* | 6/2015 | Siomina | ........... | H04B 17/309 |
| | | | | 324/76.39 |
| 2018/0103400 A1* | 4/2018 | Mochizuki | ........... | H04W 36/04 |
| 2019/0037635 A1* | 1/2019 | Guo | ........... | H04W 76/27 |
| 2020/0100151 A1* | 3/2020 | Kumar | ........... | H04W 36/302 |

FOREIGN PATENT DOCUMENTS

| | | | |
|---|---|---|---|
| CN | 107277845 A | 10/2017 | |
| CN | 107820717 A | 3/2018 | |
| CN | 108495345 A | 9/2018 | |
| CN | 109151921 A | 1/2019 | |
| EP | 2482587 A1 | 8/2012 | |
| EP | 3432642 A1 | 1/2019 | |
| EP | 3834477 A2 | 6/2021 | |
| WO | WO-2017180471 A1 * | 10/2017 | ........... H04W 36/36 |
| WO | 2018084968 A1 | 5/2018 | |

OTHER PUBLICATIONS

3GPP TSG-RAN WG2 Meeting#117-e, R2-2203686 Title: Reply LS on Signalling of PC2 V2x intra-band concurrent operation (Year: 2022).*
CATT, "Considerations on NTN mobility", 3GPP Draft; R3-186368, Nov. 11, 2018, 5 pages.
3GPP TS 38.300, V15.3.1, 3rd Generation Partnership Project; Technical Specification Group Radio Access Network; NR; NR and NG-RAN Overall Description; Stage 2 (Release 15), Oct. 7, 2018, pp. 1-92.
Tno et al., "Idle State Mobility Scenarios for Non-Terrestrial Networks", 3GPP Draft; R3-185957, Sep. 28, 2018, 5 pages.
Huawei et al. "Inter-RAT cell reselection between NR and LTE", 3GPP TSG-RAN WG2 NR Ad hoc 0118, R2-1801204, Vancouver, Canada, Jan. 22-26, 2018, 4 pages.

* cited by examiner

NETWORK SELECTION METHOD, NETWORK DEVICE, AND TERMINAL DEVICE

CROSS-REFERENCE TO RELATED APPLICATIONS

This application is a continuation of International Application No. PCT/CN2020/074253, filed on Feb. 4, 2020, which claims priority to Chinese Patent Application No. 201910115471.X, filed on Feb. 14, 2019, The disclosures of the aforementioned applications are hereby incorporated by reference in their entireties.

TECHNICAL FIELD

This application relates to the field of wireless communications, and more specifically, to a network selection method, a network device, and a terminal device.

BACKGROUND

In recent years, satellite communication ushered a new round of development upsurge around the world, and a terrestrial 5th generation new radio (5G NR) will come into commercial use. Convergence of the satellite communication and the terrestrial 5G has become a new hot topic of discussion.

The most important thing about 5G, a next-generation network of Internet of Everything, and a conventional network is that, 5G should span not only human-human, human-machine, and machine-machine, but also all industries. A non-terrestrial network (NTN) is a blue ocean of 5G networks, and has attracted wide attention. The NTN network is used to provide a service for a terminal device in an area in which no terrestrial communications network (TN) is deployed. The area served by the NTN network may be a land area where human activities occur and an edge extension area thereof, for example, an ocean, a desert, a remote mountain, or a polar area that is rarely traveled. NTN communication, for example, a satellite network system, is more suitable for activities such as geological exploration, an adventure, and rescue in places that are rarely traveled as described above.

Compared with a conventional TN network, the NTN network is a communications network in which an aircraft or a satellite is introduced into a communications system as a relay node or a base station. In the NTN network, because a satellite device participates in a communication process, when data is sent between the terminal device and a network device, the data needs to be transmitted to the satellite relay node or the base station. In this case, a long propagation distance causes a high propagation delay, and consequently round-trip time (RTT) of data transmission may reach tens of milliseconds to hundreds of milliseconds. However, RTT of the conventional TN network is several milliseconds or less. In addition, power of the terminal device is limited. When the terminal device communicates with the relay node on the satellite device or the network device, signal attenuation is relatively large due to a relatively long distance. In this case, a signal of the NTN network is poorer than that of the TN network.

Currently, whether the terminal device is in connected mode or idle mode, the terminal device periodically measures a surrounding cell. When detecting, through measurement, that a surrounding network cell meets a specific condition, the terminal device in connected mode may perform handover. When detecting, through measurement, that a surrounding network cell meets a specific condition, the terminal device in idle mode may perform cell reselection. The actions are intended to enable the terminal device to access or camp on a cell with better signal quality to communicate with a network. In one aspect, measurement on a cell by the terminal device causes power consumption, and may cause service interruption. In addition, the terminal device needs to access a network with better quality of service, such as the TN network, at an appropriate occasion. In addition to the NTN network and the TN network, in another communication scenario under discussion, the terminal device in an NPN network (Non-public network) and a PN network (Public network) also has a similar communication requirement. Considering this, when does the terminal device measure and how to measure a surrounding network cell of another network type (for example, a TN network cell or a PN network cell) become urgent problems to be resolved.

SUMMARY

Embodiments of this application provide a network selection method, a network device, and a terminal device, to resolve a problem of power consumption or an impact on quality of service caused when a terminal device excessively or continuously enables cell measurement on a cell of a current network.

According to a first aspect, a network selection method is provided. The method includes: A first network device sends a first message to a terminal device. The first message includes a message that indicates the terminal device to measure a cell of a first-type network, the first-type network is a high-priority network of the terminal device, and a network provided by the first network device does not belong to the first-type network.

According to the network selection method in this embodiment, the first network device sends the first message to the terminal device, to indicate the terminal device to enable measurement on the cell of the first-type network. In addition, the first-type network is different from the network provided by the first network device, and the first-type network is the high-priority network of the terminal device. In this case, the terminal device enables network cell measurement only when the high-priority network exists. This avoids a problem of power consumption or an impact on quality of service caused when the terminal device excessively or continuously performs measurement.

Optionally, the high-priority network is a network selectable or accessible for the terminal device and that has a higher priority for the terminal device. For example, the terminal device sets a network that can provide a higher-quality communications service for the terminal device as the high-priority network. When the high-priority network exists, the terminal device preferentially selects a cell of the high-priority network to access. The terminal device selects a cell of a non-high-priority network for access only when the terminal device cannot access the cell of the high-priority network. For example, compared with an NTN network, a TN network has better quality of service, and therefore is considered by some terminal devices as the high-priority network. However, some terminal devices that can access both a PN network and an NPN network may set the NPN network as the high-priority network.

The first-type network is different from a network currently provided by the first network device, so that the terminal device can measure cells of different network types, and is not limited to measuring cells of the current network. This improves flexibility of the network cell measurement.

With reference to the first aspect, in a first possible implementation, the first message is used to indicate the terminal device to measure the cell of the first-type network within a first measurement GAP.

It should be understood that the first network device may send the first measurement GAP to the terminal device, so that the terminal device can measure the first-type network within the first measurement GAP. The first measurement GAP may be a special measurement GAP or an automatic measurement GAP that is configured by the network device for the terminal device. The terminal device may determine, based on a measurement requirement of the terminal device, duration of a measurement GAP or a moment of starting a measurement GAP.

According to the network selection manner in this embodiment, the terminal device may set the duration of the first measurement GAP based on time required for measurement. This avoids that when the duration of the measurement GAP is excessively short, the terminal device cannot complete a process such as reading a system message or measuring a network cell. In this way, the duration of the first measurement GAP is fully utilized, and efficiency of the network cell measurement is improved.

With reference to the first aspect, in a second possible implementation, before the first network device sends the first message to the terminal device, the method further includes: The first network device receives first information sent by the terminal device, where the first information is used to indicate the cell of the first-type network. The first network device determines that the first-type network exists around a coverage area of the first network device.

With reference to the first aspect, in a third possible implementation, that the first network device determines that the first-type network exists around a coverage area of the first network device includes: The first network device determines, based on first assistance information, that the cell of the first-type network exists around the coverage area of the first network device.

According to the network selection method in this embodiment, the first network device may learn of information such as a network type or a network ID of the high-priority network of the terminal device by using the first information, and then determine, by using the first assistance information, whether the high-priority network exists around the coverage area of the first network device. When the high-priority network exists, the terminal device may be indicated to enable the measurement on the cell of the high-priority network. This avoids a problem of power consumption or an impact on quality of service caused when the terminal device blindly enables measurement on the network cell when the terminal device is uncertain whether the cell of the high-priority network exists around the terminal device.

With reference to the first aspect, in a fourth possible implementation, the first information or the first assistance information includes at least one of the following information: a network identifier ID, a cell frequency, a cell ID, a public land mobile network PLMN ID, a network type, a cell type, location information of the terminal device, a moving speed of the terminal device, and a moving direction of the terminal device.

It should be understood that the first information or the first assistance information that is sent by the terminal device not only includes information about the network provided by the first network device and/or the first-type network, but also includes information about the terminal device.

According to the network selection method in this embodiment, information related to a network and the terminal device is sent to the first network device, so that the first network device can more accurately determine whether to indicate the terminal device to measure the cell of the first-type network.

With reference to the first aspect, in a fifth possible implementation, before the first network device sends the first message to the terminal device, the method further includes: The first network device receives request information of the terminal device, where the request information is used to request configuration information of the first measurement GAP.

It may be understood that when the terminal device determines that the terminal device needs to access the high-priority network or determines that the high-priority network exists around the first network device or around the terminal device, the terminal device sends the request information to the first network device, to request the first network device to send the first measurement GAP to the terminal device.

According to the network selection method in this embodiment, when identifying that a selectable high-priority network exists, the terminal device requests the first network device to send the configuration information of the first measurement GAP, so that the first network device can send the measurement configuration information specific to the terminal device, to avoid blindly indicating, to the terminal device, that the terminal device can measure any network cell.

With reference to the first aspect, in a sixth possible implementation, the first network device receives a measurement result that is sent by the terminal device and that is obtained by measuring the cell of the first-type network by the terminal device.

With reference to the first aspect, in a seventh possible implementation, the measurement result includes at least one of the following information: the network identifier ID, the cell frequency, the cell ID, the public land mobile network PLMN ID, a network type, the cell type, the location information of the terminal device, the moving speed of the terminal device, and the moving direction of the terminal device.

According to the network selection method in this embodiment, the terminal device sends the measurement result to the first network device, so that the first network device can determine, based on the measurement result, whether the terminal device supports handover to or reselecting the cell of the first-type network.

With reference to the first aspect, in an eighth possible implementation, the first network device determines whether to support handover of the terminal device from a network in which the terminal device is currently located to the first-type network. When the first network device supports the handover, the first network device sends a first indication message to the terminal device, where the first indication message is used to indicate the terminal device to perform the handover. When the first network device does not support the handover, the first network device sends a radio resource control RRC release message to the terminal device.

With reference to the first aspect, in a ninth possible implementation, the RRC release message carries a release cause, and the release cause indicates that the cell of the first-type network exists around the coverage area of the first network device.

According to the network selection method in this embodiment, the first network device sends the RRC release message to the terminal device, so that the terminal device can be disconnected from the current network, and then the terminal device in idle mode reselects the cell of the first-type network.

With reference to the first aspect, in a tenth possible implementation, the first network device sends a second message to a core network device, where the second message is used to indicate the terminal device to disconnect from the current network.

With reference to the first aspect, in an eleventh possible implementation, the first network device determines, based on first assistance information, that the first-type network exists around a coverage area of the first network device. The first message belongs to a broadcast message.

According to the network selection method in this embodiment of this application, the network device may indicate, to a terminal network, that the first-type network exists around the coverage area of the first network device by carrying indication information in the broadcast message, so that the terminal device in idle mode can also learn that the selectable high-priority network exists.

According to a second aspect, a network selection method is provided. The method includes: A terminal device receives a first message sent by a first network device. The first message includes a message that indicates the terminal device to measure a cell of a first-type network, the first-type network is a high-priority network of the terminal device, and a network provided by the network device does not belong to the first-type network. The terminal device measures the cell of the first-type network.

According to this embodiment of this application, the terminal device is indicated by the received first message to measure the cell of the first-type network, and the first-type network is a selectable high-priority network of the terminal device, so that the terminal device enables network cell measurement only when the selectable high-priority network exists. This avoids a problem of power consumption or an impact on quality of service caused when the terminal device excessively or continuously performs measurement. In addition, the first-type network is different from a network currently provided by the first network device, so that the terminal device can measure different types of network cells, and is not limited to measuring cells of the current network. This improves flexibility of the network cell measurement.

With reference to the second aspect, in a first possible implementation, the first message is used to indicate the terminal device to measure the cell of the first-type network within a first measurement GAP.

It should be understood that the first network device may send the first measurement GAP to the terminal device, so that the terminal device can measure the first-type network within the first measurement GAP. The first measurement GAP may be a special measurement GAP or an automatic measurement GAP that is configured by the network device for the terminal device. The terminal device may determine, based on measurement duration, duration of a measurement GAP or a moment of starting a measurement GAP.

According to the network selection manner in this embodiment, the terminal device may set time of the first measurement GAP based on duration required for measurement. This avoids that the time of the measurement GAP is excessively short and that the terminal device cannot complete a process such as reading a system message or measuring a network cell. In this way, the time of the first measurement GAP is fully utilized, and efficiency of the measurement is improved.

With reference to the second aspect, in a second possible implementation, before the terminal device receives the first message sent by the first network device, the method further includes: The first network device sends first information to the terminal device, where the first information is used to indicate the first-type network.

With reference to the second aspect, in a third possible implementation, the first information includes at least one of the following information: a network identifier ID, a cell frequency, a cell ID, a public land mobile network PLMN ID, a network type, a cell type, location information of the terminal device, a moving speed of the terminal device, and a moving direction of the terminal device.

It should be understood that the first information that is sent by the terminal device not only includes information about the network provided by the first network device and/or the first-type network, but also includes information about the terminal device.

According to the network selection method in this embodiment, related information of at least one of the networks provided by the first network device, the first-type network, and the terminal device is sent to the first network device, so that the first network device can more accurately determine whether to indicate the terminal device to measure the cell of the first-type network.

With reference to the second aspect, in a fourth possible implementation, before the terminal device receives the first message sent by the first network device, the method further includes: The terminal device sends request information to the first network device, where the request information is used to request configuration information of the first measurement GAP.

With reference to the second aspect, in a fifth possible implementation, before the terminal device sends the request information to the first network device, the method further includes: The terminal device determines that the terminal device needs to access the first-type network or that the first-type network exists around a coverage area of the first network device.

According to the network selection method in this embodiment, when identifying that a selectable high-priority network exists, the terminal device requests the first network device to send the configuration information of the first measurement GAP, so that the first network device can send the measurement configuration information specific to the terminal device, to avoid blindly indicating, to the terminal device, that the terminal device can measure any network cell.

With reference to the second aspect, in a sixth possible implementation, the terminal device sends, to the first network device, a measurement result that is obtained by measuring the cell of the first-type network by the terminal device.

With reference to the second aspect, in a seventh possible implementation, the measurement result includes at least one of the following information: the network identifier ID, the cell frequency, the cell ID, the public land mobile network PLMN ID, a network type, the cell type, the location information of the terminal device, the moving speed of the terminal device, and the moving direction of the terminal device.

According to the network selection method in this embodiment, the terminal device sends the measurement result to the first network device, so that the first network device can determine, based on the measurement result, whether the terminal device supports handover to or reselecting the cell of the first-type network.

With reference to the second aspect, in an eighth possible implementation, the terminal device receives a first indication message sent by the first network device, where the first indication message is used to indicate the terminal device to perform handover from a network cell in which the terminal device is currently located to the cell of the first-type network. The terminal device hands over to the cell of the first-type network.

With reference to the second aspect, in a ninth possible implementation, the terminal device receives a radio resource control RRC release message sent by the first network device, where the RRC release message carries a release cause, and the release cause indicates that the cell of the first-type network exists around the coverage area of the first network device. The terminal device reselects the cell of the first-type network.

According to the network selection method in this embodiment, the first network device sends the RRC release message to the terminal device, so that the terminal device can be disconnected from the current network, and then the terminal device in idle mode reselects the cell of the first-type network.

With reference to the second aspect, in a tenth possible implementation, before the terminal device measures the cell of the first-type network, the method further includes: The terminal device receives a broadcast message sent by the first network device, where the broadcast message includes the first message. The terminal device determines, based on the first message, that the first-type network exists around the coverage area of the first network device.

It should be understood that the terminal device may be a terminal device in idle mode, and the terminal device in idle mode can receive the broadcast message sent by the first network device.

According to the network selection method in this embodiment, the network device may indicate, to a terminal network, that the first-type network exists around the coverage area of the first network device by carrying indication information in the broadcast message, so that the terminal device in idle mode can also learn that the selectable high-priority network exists.

With reference to the second aspect, in an eleventh possible implementation, the terminal device accesses the cell of the first-type network.

With reference to the second aspect, in a twelfth possible implementation, the terminal device sends second assistance information to a second network device in the first-type network, where the second assistance information includes at least one of the following information: a type indication of a cell of the network device and/or a type indication of the first-type network, an ID of the cell of the network device and/or the ID of the first-type network, a cell ID of the cell of the network device and/or the cell ID of the first-type network, a cell frequency of the cell of the network device and/or the cell frequency of the first-type network, the PLMN, and a geographical location of UE during network selection.

According to the network selection method in this embodiment, after being handed over to or reselecting the cell of the first-type network, the network device may send the second assistance information obtained in a moving process to the second network device, so that the second network device can use the second assistance information to serve a terminal device that may subsequently undergo a similar moving process.

With reference to the second aspect, in a thirteenth possible implementation, the measurement performed by the terminal device on the cell of the first-type network includes: The terminal device measures signal quality of the cell of the first-type network and/or reads a broadcast message of the cell of the first-type network, where the broadcast message of the cell of the first-type network includes a master information block and/or a system information block.

According to the network selection method in this embodiment of this application, the terminal device enables network cell measurement only when the selectable high-priority network exists. This avoids a problem of power consumption or an impact on quality of service caused when the terminal device excessively or continuously performs measurement. In addition, the first-type network is different from a network currently provided by the first network device, so that the terminal device can measure different types of network cells, and is not limited to measuring cells of the current network. This improves flexibility of the network cell measurement.

According to a third aspect, a network device is provided. The network device is configured to perform an operation of the network device according to any one of the first aspect or the possible implementations of the first aspect. Specifically, the network device includes a corresponding component configured to perform the steps or functions described in the first aspect, and may be the first network device in the first aspect. The steps or functions may be implemented by using software, hardware, or a combination of hardware and software.

According to a fourth aspect, a terminal device is provided. The terminal device may be configured to perform an operation of the terminal device according to any one of the second aspect or the possible implementations of the second aspect. Specifically, the terminal device may include a corresponding component configured to perform the steps or functions described in the second aspect. The steps or functions may be implemented by using software, hardware, or a combination of hardware and software.

According to a fifth aspect, a communications device is provided. The communications device includes a processor and a memory, where the memory is configured to store a computer program, and the processor is configured to invoke the computer program from the memory and run the computer program, so that the communications device performs the network selection method in any one of the first aspect or the possible implementations of the second aspect.

In a possible implementation, there are one or more processors, and there are one or more memories.

In a possible implementation, the memory may be integrated with the processor, or the memory and the processor are disposed separately.

According to a sixth aspect, a computer storage medium is provided. The computer storage medium stores program code, and the program code is used to indicate to perform the method according to any one of the first aspect or the possible implementations of the second aspect.

According to a seventh aspect, a communications device is provided. The communications device includes at least one processor and a communications interface. The communications interface is used by the communications apparatus to exchange information with another communications apparatus. When program instructions are executed in the at least one processor, the communications device is enabled to implement a function of the terminal device or the network device in the method according to any one of the first aspect or the second aspect.

The embodiments of this application provides a method for performing network selection, a network device, and a terminal device, and a terminal device. The terminal device enables network cell measurement only when a selectable high-priority network exists. This avoids a problem of power consumption or an impact on quality of service caused when the terminal device excessively or continuously performs network cell measurement. In addition, a first-type network is different from a network currently provided by a first network device, so that the terminal device can measure different types of network cells, and is not limited to measuring cells of the current network. This improves flexibility of the network cell measurement.

DETAILED DESCRIPTION OF ILLUSTRATIVE EMBODIMENTS

Figure 1:
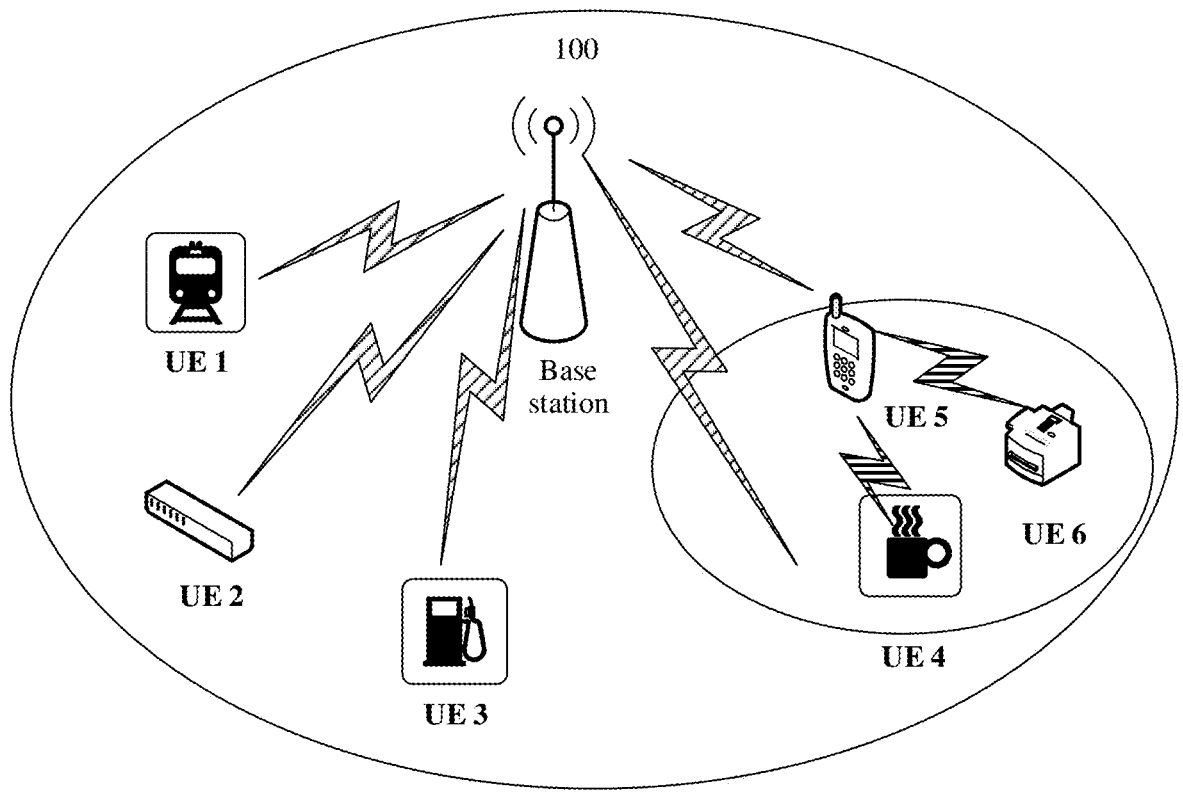
FIG. 1 is a schematic diagram of a system to which an embodiment of this application is applied.

The following describes technical solutions of this application with reference to the accompanying drawings.

The technical solutions in embodiments of this application may be used in various communications systems, such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, and a future 5th generation (5G) system or new radio (NR) system.

A network device in the embodiments of this application may be a device configured to communicate with the terminal device. The network device may be a base transceiver station (BTS) in the global system for mobile communications (GSM) system or the code division multiple access (CDMA) system, a NodeB (NodeB, NB) in the wideband code division multiple access (WCDMA) system, an evolved NodeB (eNB or eNodeB) in the LTE system, or a radio controller in a cloud radio access network (CRAN) scenario. Alternatively, the network device may be a relay station, an access point, a vehicle-mounted device, a wearable device, a network device in the future 5G network, a network device in a future evolved PLMN network, or the like. This is not limited in the embodiments of this application.

A terminal device in the embodiments of this application may be user equipment (UE), an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in the future 5G network, or the like. This is not limited in the embodiments of this application.

In the embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems that process a service by using a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in the embodiments of this application is not specifically limited in the embodiments of this application, provided that a program that records code for the method provided in the embodiments of this application can be run to perform communication according to the method provided in the embodiments of this application. For example, the method provided in the embodiments of this application may be performed by the terminal device, the network device, or a functional module that is in the terminal device or the network device and that can invoke and execute the program.

FIG. 1 is a schematic diagram of a system to which an embodiment of this application is applied. As shown in FIG. 1, a communications system 100 may include a network device and a terminal device, and the network device and the terminal may be wirelessly connected. It should be understood that, in the communications system in FIG. 1, there is an entity that can send transmission direction indication information and an entity that can receive the transmission direction indication information. On the basis that the foregoing condition is met, there may be various communications systems. For example, the communications system may be a 5G NR system, or may be another communications system. The transmission direction indication information may be, for example, information that is sent by the network device to the terminal device and that indicates the terminal device to perform cell handover or cell reselection.

It should be understood that in FIG. 1, only an example in which the network device in the communications system is a base station (BS) is used for description. However, this embodiment of the present invention is not limited thereto. For example, the system may further include more other network devices or terminal devices. Similarly, the system may include more different network types or network cells. It should be further understood that the system may also be referred to as a network. This is not limited in the embodiments of the present invention.

For example, in FIG. 1, a base station and UE 1 to UE 6 form a communications system. In the communications system, the UE 1 to the UE 6 may send uplink data to the base station, and the base station may send downlink information to the UE 1 to the UE 6. In addition, UE4 to the UE 6 may also form a communications system. In the communications system, UE5 may send downlink information to the UE4 or the UE 6. A network type of a network provided by the base station may be different from a network type of a network provided by the UE5. For example, the network provided by the base station may be a public network (PN), and the network provided by the UE5 may be a non-public network (NPN).

Optionally, the embodiments of this application may also be applied to another communications system, for example, applicable to a non-terrestrial communications system, for example, a communications network in which a base station is on a satellite or another flight device, or a communications network in which a satellite or a flight device is used as a relay for forwarding.

Optionally, the embodiments of this application may be applied to some environments. For example, in the middle of an ocean, an NTN network is required for communication, and a TN network may not exist in a large area around. In this case, the terminal device may be enabled not to perform cell measurement, to save power or ensure current communication quality. However, when the terminal moves and is close to an edge covered by the NTN and the TN network, to obtain a better service, the terminal needs to perform reselection or handover to the TN network. In this case, the terminal device needs to enable measurement on another network cell around.

Figure 2:
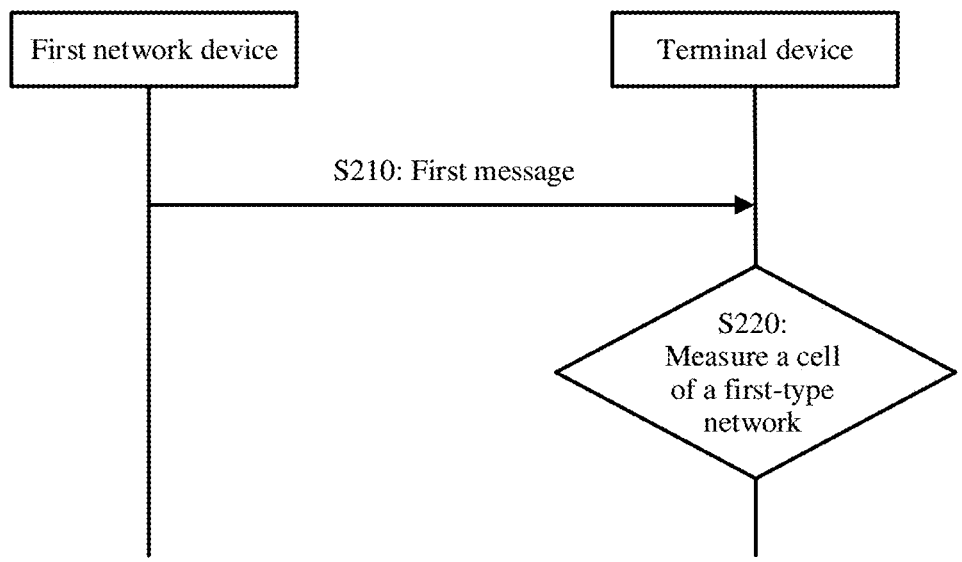
FIG. 2 is a schematic flowchart of a network selection method according to an embodiment of this application.

FIG. 2 is a schematic flowchart of a network selection method according to an embodiment of this application. The method includes steps S210 and S220.

Step S210: A first network device sends a first message to a terminal device.

The first network device sends the first message to the terminal device located in a cell covered by the first network device, where the first message may be used to indicate the terminal device to measure a first-type network. The first-type network is a high-priority network of the terminal device, and the first-type network is different from a network provided by the first network device.

Optionally, the terminal device may be currently located in a network cell provided by the first network device, and the terminal device may be in connected mode or idle mode.

Optionally, if the first network device identifies that a cell of the first-type network exists around a coverage area of the first network device, the first network device sends the first message to the terminal device. The first message may be used to indicate the terminal device to measure the cell of the first-type network.

Optionally, the first message may be an indication message for indicating the terminal device to measure the cell of the first-type network, or may be a message including the indication message, for example, a broadcast message. Specifically, the first message may include measurement configuration information that is sent by the first network device to the terminal device and that is for measurement on the cell of the first-type network. The measurement configuration information may be, for example, a first measurement GAP.

The terminal device may measure the cell of the first-type network by using the measurement configuration information. For example, the terminal device may measure the cell of the first-type network within the first measurement GAP.

Optionally, the first message may also include indication information that is sent by the network device to the terminal device and that is for measurement on the cell of the first-type network. The indication information is used to indicate the terminal device to measure the cell of the first-type network by using preconfigured measurement configuration information. The preconfigured measurement configuration information may be a preconfigured first measurement GAP. The measurement configuration information may be preconfigured in a plurality of manners. For example, the network device may send information about the first measurement GAP to the terminal device in advance, or write the information about the first measurement GAP into a protocol for the terminal device in advance.

It may be understood that a measurement GAP is a time period in which the terminal device may leave a frequency of a current serving network to perform measurement on a frequency of another network. In other words, within the measurement GAP, the terminal device may perform inter-frequency measurement or inter-RAT measurement. For example, before handing over to or reselecting another cell other than a cell of the current serving network, the terminal device may measure, within the measurement GAP, the cell to which the terminal device is to hand over or that the terminal device reselects.

A GAP measurement mode may be determined by the network device, or may be determined by the terminal device. In this embodiment of this application, the first measurement GAP that may be determined by the terminal device is used as an example for further description. The foregoing first measurement GAP may be a special measurement GAP or an automatic measurement GAP that is configured by the network device for the terminal device. The terminal device may determine, based on measurement duration, duration of a measurement GAP or a moment of starting a measurement GAP. For example, when measuring a cell of a first network type, in addition to measuring information such as a frequency and signal quality in a current cell, the terminal device may further need to read a system message, and reading the system message requires additional searching and/or reading duration for the system message. In this case, the terminal device may determine duration of the first measurement GAP based on duration required for the terminal device to perform measurement. For another example, when the cell of the first-type network does not exist around the terminal device, the terminal device does not need to enable measurement. However, when a geographical location of the terminal device changes, for example, changes to an edge of a current cell and the cell of the first-type network, the terminal device may determine to enable measurement, to measure the cell of the first-type network.

Optionally, the first message may further carry indication information, where the indication information is used to indicate that the first-type network exists around the terminal device. The indication information may be, for example, a network type and/or a network ID of the first-type network. For example, the first message may be a broadcast message sent by the network device or may be included in the broadcast message.

Optionally, the first-type network is different from the network provided by the first network device. That the foregoing network provided by the first network device does not belong to the first-type network may be that the network provided by the first network device and the first-type network have different network types, cell types, or the like. The first-type network may be the high-priority network of the terminal device. The high-priority network may be in a network that can be accessed by the terminal device, and may be a network device that the terminal device preferentially selects to access. For example, compared with a network corresponding to the cell in which the terminal device is currently located, the terminal device can obtain better quality of service in the first-type network. In this case, the terminal device considers the first-type network as the high-priority network, and selects the first-type network from the current network and the first-type network for access. More specifically, the quality of service may be communication quality. For example, communication performed by the terminal device in the first-type network may be faster, more secure, and more accurate, or channel quality may be more stable. The high-priority network of the terminal device may be built in the terminal device, or may be specified in a protocol, or may be configured by the network device for the terminal device.

Optionally, the high-priority network of the terminal device in this embodiment of this application may be a high-priority network selectable for the terminal device, namely, a high-priority network to which the terminal device can hand over or access. In other words, for the terminal device in connected mode, the terminal device in connected mode can hand over from a cell of the current network to a cell of the high-priority network. For the terminal device in idle mode, the terminal device in idle mode can reselect the cell of the high-priority network. In other words, it is feasible for the terminal device to establish a connection to the high-priority network and perform signaling exchange. "Selectable" means that the terminal device can successfully access the network. For example, when the terminal device is in a coverage area of a cell of a high-priority network, it is considered that the high-priority network is selectable.

Optionally, before sending the first message to the terminal device, the first network device may further collect first assistance information. The first assistance information may include at least one of the following information: one or more of a network identifier ID, a cell frequency, a cell ID, a public land mobile network PLMN ID, a network type, a cell type, location information of the terminal device, a moving speed of the terminal device, a moving direction of the terminal device, and the like.

Optionally, when a condition that the network provided by the first network device is different from the first-type network is met, there may be a plurality of network types of the network provided by the first network device and the first-type network. For example, if a network type currently provided by the network device is an NTN network, the first-type network may be a TN network. Alternatively, if a network type currently provided by the network device is a PN network, the first-type network may be an NPN network. Alternatively, if a network currently provided by the network device is a non-3GPP network, the first-type network may be a 3GPP network, or vice versa.

Optionally, the network device or the terminal device may learn of a network type of the high-priority network of the terminal device in advance. When determining that the high-priority network exists around the coverage area of the first network device, the terminal device and/or the network device may determine that the terminal device enables measurement on the cell of the high-priority network. For example, if the terminal device is currently located in the NTN network, and the TN network is the high-priority network of the terminal device, when the terminal device and/or the first network device identifies that the TN network exists around the coverage area of the first network device, it may be determined that the terminal device can enable network cell measurement on the TN network. In other words, if the current serving network of the terminal device is the NTN network, when the terminal device or the network device determines that a high-priority TN network exists around the coverage area of the network device, the network device may send the first message to the terminal device, to indicate the terminal device to measure the TN network that exists around the terminal device.

An area around a coverage area of a cell of the first network device may be an area near the coverage area of the cell of the first network device or an area near the terminal device, and the terminal device can hand over to or reselect the cell of the first-type network around the coverage area. Alternatively, an area around the coverage area of the first network device may be an area adjacent to a cell covered by the first network device. Alternatively, an area around a coverage area of a cell of the first network device may be an area in which a cell that has a partially overlapping area with the cell of the first network device is located. The coverage area of the cell of the first network device may alternatively be understood as an area in which the terminal device can receive a signal of the cell. When the high-priority network of the terminal device exists around the coverage area of the cell of the first network device, the network device and the terminal device determine that the high-priority network needs to be accessed. Before accessing the high-priority network, the terminal device needs to first measure the cell of the high-priority network.

Optionally, the network device may determine, by using the first assistance information, whether the first-type network exists around the network device. The first assistance information may be historical assistance information collected by the network device from another terminal device before the current terminal device, and the another terminal device may include a terminal device that has performed a moving process between the network provided by the network device and the first-type network. The first assistance information may include information related to the network provided by the network device, the first-type network, or the terminal device. The first network device may identify, by using the first assistance information, whether the first-type network exists around the coverage area of the first network device, to determine whether to indicate the terminal device to perform measurement on the cell of the first-type network. For example, if some terminal devices in connected mode have moved between the network provided by the network device and the first-type network, for example, have handed over from a network in which the terminal devices are currently located to the first-type network, after completing the handover, the terminal devices may report related information of the networks accessed before and after the handover and related information of the terminal devices to a second network device in the first-type network. For another example, if some terminal devices in idle mode have performed a process of reselecting the cell of the first-type network, after completing the cell reselection, the terminal devices may report information related to the first-type network and the terminal devices to the second network device. Optionally, after learning of the information, the second network device may directly or indirectly notify the first network device, so that the first network device has a determining basis. Alternatively, the terminal device first buffers the assistance information on the terminal device, and directly reports the assistance information to the first network device when re-accessing the cell of the first-type network. The NTN network and the TN network are used as examples for more specific description. If the terminal device has moved from the NTN to the TN network, it indicates that the TN network exists around the NTN network in which the terminal device is located before moving. After the terminal device moves, the terminal device may report related information such as related information of the network in a moving process and a location of the terminal device to a network device in the TN network. The related information is uploaded to a core network as the first assistance information, and the core network indicates the first assistance information to the NTN network in which the terminal device is located before moving, or the terminal device directly indicates the first assistance information through an interface between network devices to the NTN network in which the terminal device is located before moving. Subsequently, the network device in the NTN may determine, based on the first assistance information, whether the high-priority network of the terminal device exists around a coverage area of a cell of the network device, to determine whether to indicate the terminal device to measure a cell of a selectable high-priority TN network.

Optionally, the terminal device may send the first assistance information to the second network device after the movement ends, or the terminal device may first record the first assistance information, and when the terminal device re-enters connected mode or has an opportunity to send an uplink service, report the first assistance information to another network device. A manner in which the terminal device reports the assistance information to a base station is not limited in this application.

S220: After receiving the first message, the terminal device measures the first-type network.

For example, the terminal device may be the terminal device in connected mode or the terminal device in idle mode. When the terminal device is in connected mode, the first message received by the terminal device may include the measurement configuration information sent by the network device or the indication information that indicates the terminal device to measure the cell of the first-type network. The terminal device measures the first-type network by using the first message. Specifically, the terminal device may measure the cell of the first-type network.

The terminal device may measure a surrounding cell in a plurality of manners.

In an example, the terminal device receives the first measurement GAP sent by the network device, and sets the duration of the measurement GAP based on time required for measuring the cell of the first-type network. The terminal device measures the cell of the first-type network within the measurement GAP.

In another example, the terminal device measures the cell of the first-type network based on the indication information included in the first message by using the preconfigured measurement configuration information.

In another example, the measurement performed by the terminal device on the cell of the first-type network may be measuring signal quality of the cell of the first-type network or reading a broadcast message of the cell of the first-type network. For example, the terminal device may read a master information block (MIB) or a system information block (SIB) that may be included in the broadcast message of the cell of the first-type network.

In this embodiment, the first network device indicates the terminal device to measure the first-type network, and the terminal device may enable measurement on the cell of the high-priority network based on the indication, so that specific measurement can be enabled when the cell of the high-priority network is available. In this way, the terminal device can access a high-priority network with better communication quality of service at an appropriate occasion. This also avoids power consumption or an impact on service continuity caused when measurement on the high-priority network remains enabled on the terminal device.

Figure 3:
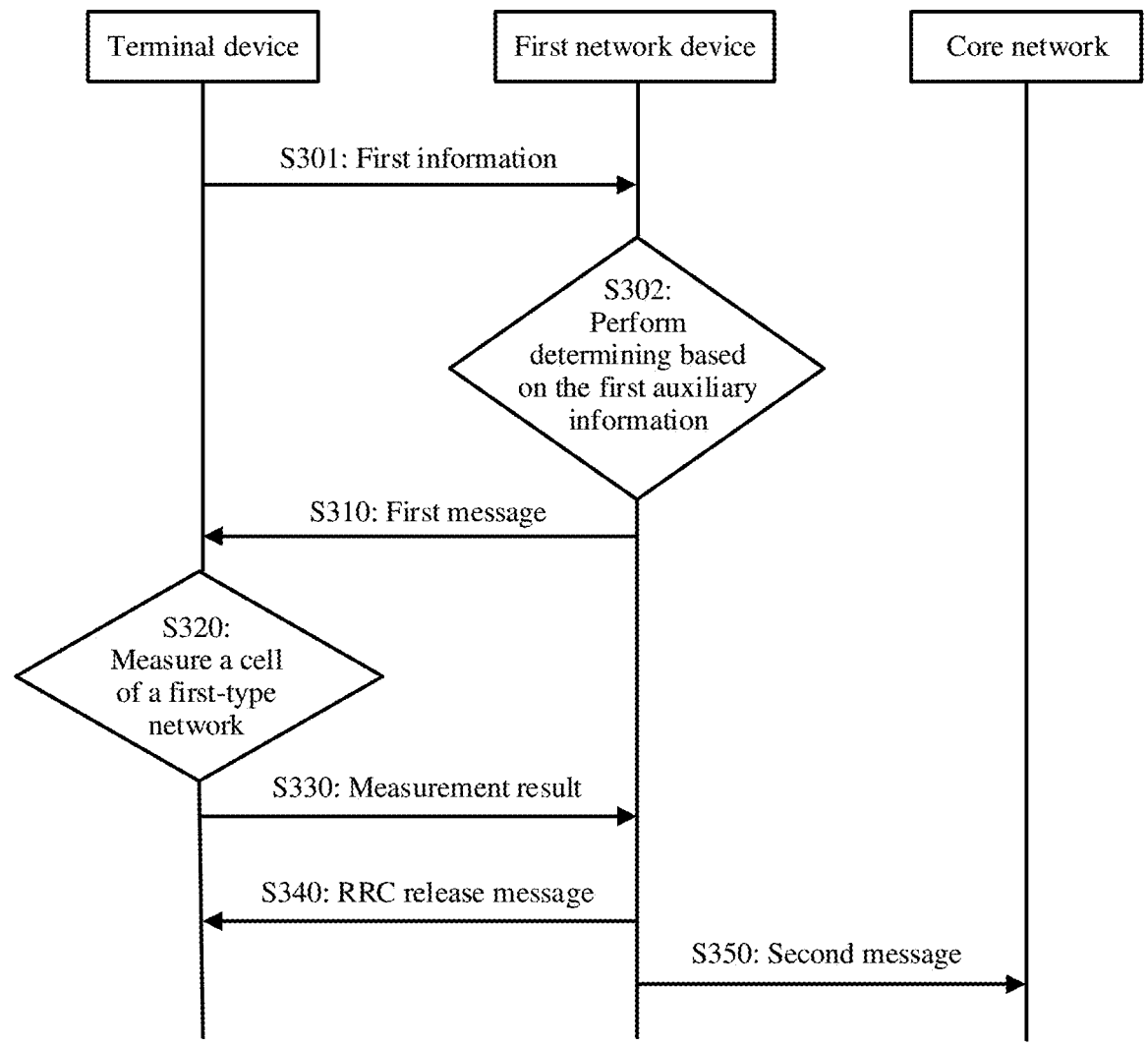
FIG. 3 is a schematic flowchart of a network selection method according to another embodiment of this application.

FIG. 3 is a schematic flowchart of a network selection method according to an embodiment of this application. The following content is included.

S301: A terminal device sends first information to a first network device, where the first information is used to indicate a first-type network.

The terminal device sends the first information to the first network device, where the first information is used to indicate a cell of the first-type network. The first-type network may be a high-priority network of the terminal device, and the first information may be information related to the first-type network.

Optionally, the terminal device is located in a cell of the first network device, and is in connected mode.

Optionally, the first information sent by the terminal device to the network device may include the related information of the first-type network, and the related information may be, for example, at least one of the following information: a network identifier ID, a cell frequency, a cell ID, a PLMN ID, a network type, a cell type, location information of the terminal device, a moving speed of the terminal device, and a moving direction of the terminal device.

S302: The network device determines, based on first assistance information, whether the first-type network exists around a coverage area of the first network device.

Optionally, the first network device receives the first information sent by the terminal device, and learns of the information about the first-type network based on the first information.

Optionally, the first network device may identify, based on the first assistance information, whether the cell of the first-type network exists around the coverage area of the first network device.

For example, the first network device learns of a network type of the high-priority network of the terminal device based on the first information, and then may learn, based on a network type that is around the coverage area of the first network device and that is provided in the first assistance information, whether a first-type network of the network type exists around the first network device. For example, if a high-priority network selectable for the terminal device is a TN network, and the first assistance information of the first network device includes information related to the TN network, after receiving the first information, the first network device may determine, with reference to the first assistance information, whether the TN network exists around the coverage area of the first network device.

Optionally, the first network device compares whether the first-type network in the first information matches the network type provided in the first assistance information, to identify whether the cell of the first-type network exists around a coverage area of the cell of the first network device. Specifically, it is assumed that the first assistance information indicates that a terminal device that previously accesses the cell of the network device has moved to a cell of a first-type network. In this case, the network device considers that the cell of the first-type network exists around the coverage area of the cell of the network device. When the first information indicates that a high-priority network of a terminal device is also the first-type network, the first network device may determine that the terminal device needs to access the cell of the first-type network.

S310: The first network device sends a first message to the terminal device, where the first message is used to indicate the terminal device to measure the cell of the first-type network.

S320: After receiving the first message, the terminal device measures the first-type network.

Step S310 and step S320 in FIG. 3 are similar to step S210 and step S220 in FIG. 2.

To avoid repetition, details are not described herein again.

S330: The terminal device sends a measurement result of the measurement on the cell of the first-type network to the first network device.

Optionally, the terminal device reports information about the cell of the first-type network that is obtained through measurement to the first network device as the measurement result. The measurement result may be, for example, one or more of the network identifier ID, the cell frequency, the cell ID, the PLMN ID, the network type, and the cell type.

Optionally, the terminal device may report information about the terminal device to the first network device as the measurement result. The reported information may be, for example, one or more of the location information of the terminal device, the moving speed of the terminal device, and the moving direction of the terminal device.

Optionally, the first network device determines, based on the measurement result, whether to support handover of the terminal device from a cell of a current network to the cell of the first-type network. When the first network device supports the handover of the terminal device to the cell of the first-type network, the first network device performs a handover process. When the first network device does not support the handover of the terminal device from the cell of the current network to the cell of the first-type network, the first network device performs step S340. To be specific, the first network device sends an RRC release message to the terminal device.

Optionally, the RRC release message sent by the network device to the terminal device carries a release cause or indication information, and the release cause or the indication information may be used to indicate that the terminal device can access the cell of the first-type network. Specifically, the release cause or the indication information may indicate, to the terminal device, that the cell of the first-type network exists around the coverage area of the first network device, or indicate the terminal device to return to idle mode and perform cell reselection, so that the terminal device accesses the cell of the first-type network.

Optionally, after completing the handover to the cell of the first-type network, the terminal device reports network information obtained in the moving process and/or assistance information of the terminal device to a second network device in the first-type network. After the second network device obtains the assistance information, the second network device sends the assistance information to the first network device or forwards the assistance information to the first network device by using a core network. The first network device may use the assistance information to serve another terminal device. For example, when the high-priority network that is of the terminal device and that is in the coverage area of the cell of the first network device is the first-type network, the first network device can determine, based on the assistance information, that the terminal device can enable measurement on the cell of the first-type network. For example, if the terminal device completes handover from an NTN network to a TN network, the terminal device may report assistance information obtained in the handover process to a network device in the TN network. The network device in the TN network directly or indirectly sends the assistance information to a network device in the NTN network, so that the network device in the NTN network learns of information about a network around a cell of the network device in the NTN network and/or related information of the terminal device, to serve a similar moving process of the terminal device in the NTN network.

Optionally, the terminal device may first record the assistance information, and when the terminal device reconnects to the first network device or has an opportunity to send an uplink service to the first network device, report the assistance information to the first network device.

S350: The first network device sends a second message to a core network device.

The second message is used by the core network device to detach (detach) the terminal device, and notify the core network that the terminal device disconnects from the current network.

In this embodiment, the first network device indicates the terminal device to measure the first-type network. The terminal device may measure selectable high-priority networks of different network types, to measure different types of network cells, and is not limited to measuring cells of only the current network. This improves flexibility of network cell measurement, and can avoid power consumption or an impact on quality of service caused when the terminal device excessively or continuously performs cell measurement.

Figure 4:
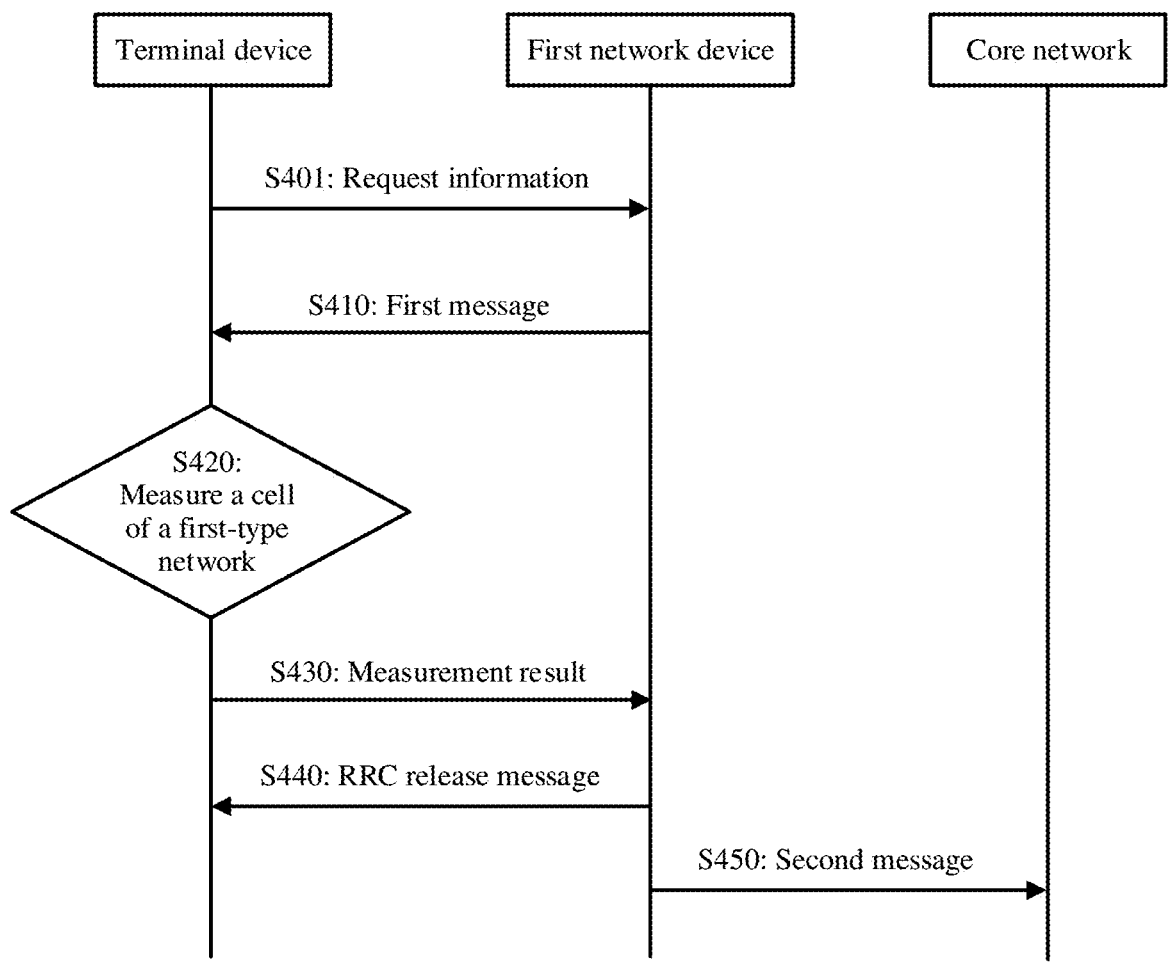
FIG. 4 is a schematic flowchart of a network selection method according to still another embodiment of this application.

FIG. 4 is a schematic flowchart of a network selection method according to an embodiment of this application. The following content is included.

S401: A terminal device sends a request message to a network device.

When the terminal device is in connected mode and determines that the terminal device needs to access a first-type network or determines that a first-type network may exist around a coverage area of a first network device, the terminal device sends the request message to the first network device. The request message is used to request measurement configuration information from the first network device. The configuration information may be, for example, a first measurement GAP.

Optionally, that the terminal device determines that the terminal device needs to access the first-type network or that the first-type network may exist around the terminal device may be based on geographical location information of the terminal device and pre-known geographical location information of the first-type network. Alternatively, the first network device sends related information of the first-type network that exists around the terminal device to the terminal device, and the terminal device determines, based on the related information, whether the first-type network is a high-priority network selectable for the terminal device.

Optionally, the related information of the first-type network may be one or more of a network identifier ID, a cell frequency, a cell ID, a PLMN ID, a network type, a cell type, and the like.

Optionally, the request message sent by the terminal device to the network device may include the related information of the first-type network.

S410: The first network device sends a first message to the terminal device.

S420: The terminal device measure a cell of the first-type network.

Step S410 to step S450 in FIG. 4 are similar to step S310 to step S350 in FIG. 3. To avoid repetition, details are not described herein again.

In this embodiment, the first network device indicates the terminal device to measure the first-type network. The terminal device may measure selectable high-priority networks of different network types, and is not limited to measuring cells of only the current network. This improves flexibility of network cell measurement, and can avoid power consumption or an impact on quality of service caused when the terminal device excessively or continuously performs cell measurement.

Figure 5:
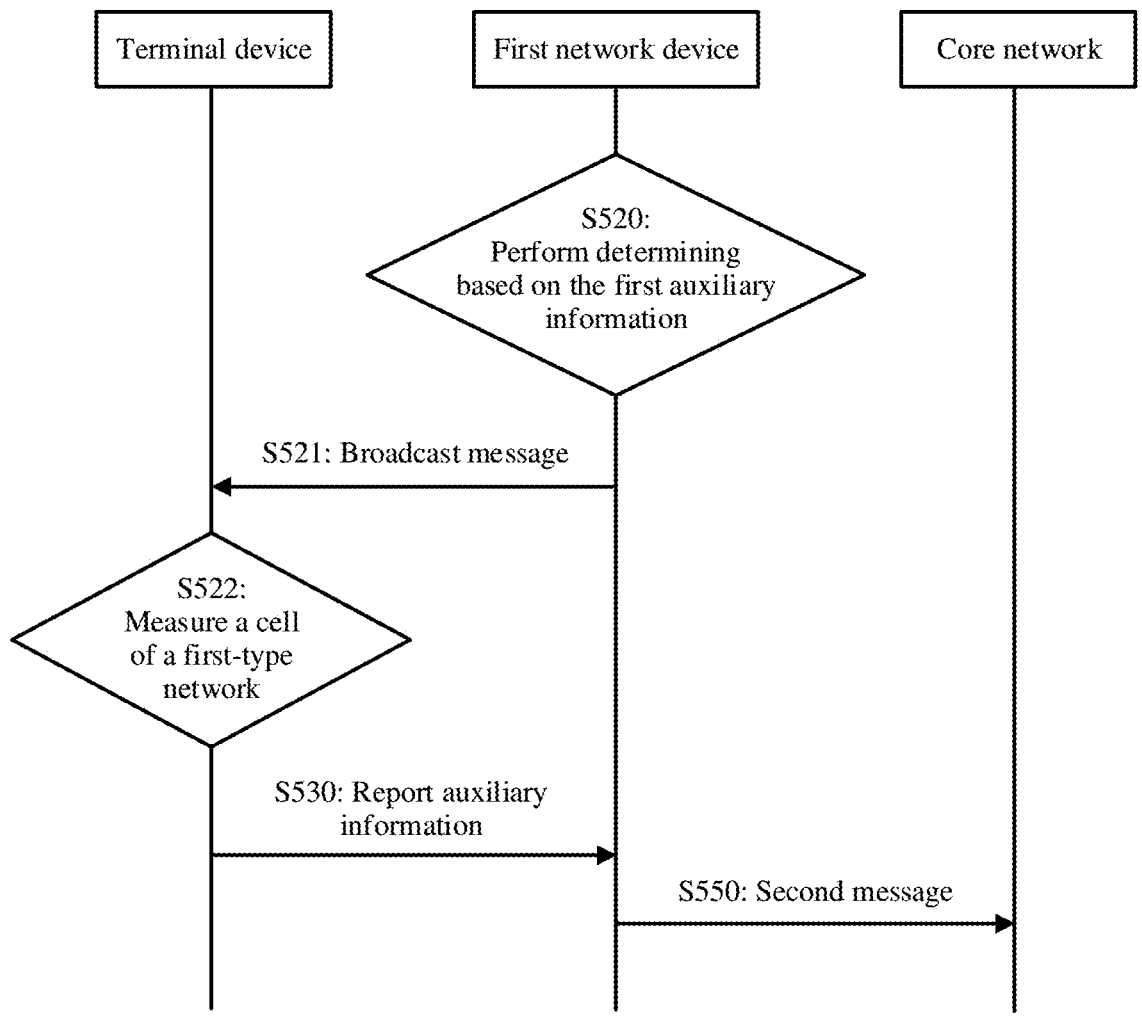
FIG. 5 is a schematic flowchart of a network selection method according to still another embodiment of this application.

FIG. 5 is a schematic flowchart of an embodiment. The following content is included.

Step S520: A first network device determines, based on first assistance information, whether a network to which a cell around a coverage area of a cell of the first network device belongs is a high-priority network of a terminal device, to determine whether the terminal device needs to access the surrounding cell.

The first network device identifies, based on the first assistance information, a network type to which the cell around the coverage area of the cell of the first network device belongs. The first network device may identify, based on the first assistance information, whether a cell of the high-priority network of the terminal device, namely, a cell in which the terminal device is more interested, exists around the coverage area of the cell of a network provided by the first network device.

Step S521: The first network device sends a first message to the terminal device.

Optionally, the terminal device is in idle mode, and a geographical location of the terminal device may be in a coverage area of the first network device, but the terminal device does not establish a connection to the first network device.

Optionally, the first message may be a broadcast message sent by the first network device, or may be indication information included in the broadcast message. The indication information may be information about the first-type network, for example, a network type or a network ID of the first-type network. The indication information may be used to indicate that the first-type network exists around the coverage area of the first network device.

S522: The terminal device measure a cell of the first-type network.

Optionally, the terminal device receives the first message sent by the first network device, and determines, based on the indication information in the first message, whether the cell of the first-type network exists around the terminal device. Specifically, the terminal device determines, based on the network type, the network ID, or the like that is of the first-type network and that is included in the first message, whether the first-type network is the high-priority network of the terminal device. When determining that the high-priority network exists around the terminal device, the terminal device enables measurement on the cell of the high-priority network.

Optionally, the measurement performed by the terminal device on the cell of the first-type network may include measuring signal quality of the cell of the first-type network or reading a broadcast message of the cell of the first-type network, where reading the broadcast message may include reading a MIB and/or a SIB in the broadcast message. The terminal device learns of the related information of the first-type network by measuring the cell of the first-type network.

Optionally, the related information of the first-type network may be one or more of the network identifier ID, a cell frequency, a cell ID, a PLMN ID, the network type, a cell type, and the like.

Optionally, after the terminal device performs measurement, if the cell of the first-type network meets a condition of cell reselection to be performed by the terminal device, the terminal device reselects the cell of the first-type network.

Optionally, condition of the cell reselection to be performed by the terminal device may include: signal quality of the cell is greater than or equal to a threshold; signal quality of the cell is greater than signal quality of a current cell; signal quality of the cell is greater than a threshold, and signal quality of a current cell is less than another threshold; or signal quality of the cell is greater than signal quality of a current cell plus an offset value.

Step S530: The terminal device reports assistance information to a second network device.

Optionally, after completing access to the cell of the first-type network, the terminal device sends the assistance information in the cell reselection process to the second network device of the first-type network. The assistance information may be one or more of a type indication of a cell of the network device and/or a type indication of the first-type network, an ID of the cell of the network device and/or the ID of the first-type network, a cell ID of the cell of the network device and/or the cell ID of the first-type network, a cell frequency of the cell of the network device and/or the cell frequency of the first-type network, the PLMN, a geographical location of UE during network selection, and the like.

Optionally, the terminal device may first record the assistance information, and when the terminal device is in connected mode again or has an opportunity to send an uplink service, report the assistance information to the second network device.

Optionally, the second network device uses the assistance information to serve a similar moving process performed by another terminal device.

In this embodiment, the first network device indicates the terminal device to measure the first-type network. The terminal device may measure selectable high-priority networks of different network types, and is not limited to measuring cells of only the current network. This improves flexibility of network cell measurement, and can avoid power consumption or an impact on quality of service caused when the terminal device excessively or continuously performs cell measurement.

The network selection methods in the embodiments of this application are described above in detail with reference to FIG. 1 to FIG. 5. The following describes apparatus embodiments in the embodiments of this application with reference to FIG. 6 to FIG. 8. It should be understood that the descriptions of the method embodiments correspond to descriptions of the apparatus embodiments. Therefore, for parts that are not described in detail, refer to the descriptions in the foregoing method embodiments.

Figure 6:
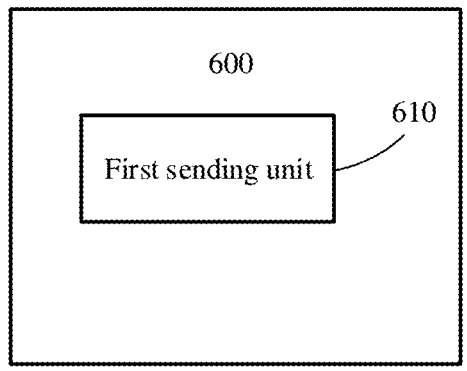
FIG. 6 is a schematic structural diagram of a network device according to an embodiment of this application.

FIG. 6 is a schematic structural diagram of a network device according to an embodiment of this application. A network device 600 in FIG. 6 may be the first network device mentioned above. The network device 600 may be configured to implement the foregoing steps performed by the first network device. The network device 600 includes a first sending unit 610.

The first sending unit 610 is configured to send a first message to a terminal device, where the first message includes a message that indicates the terminal device to measure a cell of a first-type network. The first-type network is a high-priority network of the terminal device, and a network provided by the first network device does not belong to the first-type network.

Optionally, the network device 600 may further include a first receiving unit, configured to receive first information sent by the terminal device, where the first information is used to indicate the first-type network.

Optionally, the network device 600 may further include a first determining unit, configured to determine that the cell of the first-type network exists around a coverage area of the first network device. The first determining unit may determine, based on first assistance information, that the cell of the first-type network exists around the coverage area of the first network device.

Optionally, the first information or the first assistance information may be one or more of a network identifier ID, a cell frequency, a cell ID, a PLMN ID, a network type, a cell type, location information of the terminal device, a moving speed of the terminal device, a moving direction of the terminal device, and the like.

Optionally, the network device 600 may further include a third receiving unit, configured to receive a measurement result that is sent by the terminal device and that is obtained by measuring the cell of the first-type network by the terminal device. The measurement result may include one or more of the network identifier ID, the cell frequency, the cell ID, the PLMN ID, the network type, the cell type, the location information of the terminal device, the moving speed of the terminal device, the moving direction of the terminal device, and the like.

Optionally, the network device 600 may further include a second determining unit, configured to determine whether to support handover of the terminal device from a cell of a network in which the terminal device is currently located to the cell of the first-type network.

Optionally, the network device 600 may further include a second sending unit, configured to: when the first network device supports the handover of the terminal device from the current network to the cell of the first-type network, send a first indication message to the terminal device, where the first indication message is used to indicate the terminal device to perform a cell handover process.

Optionally, the network device 600 may further include a third sending unit, configured to: when the first network device does not support the handover of the terminal device to the cell of the first-type network, send a radio resource control RRC release message to the terminal device. The RRC release message carries a release cause or indication information, and the release cause or the indication information indicates that the terminal device can access the cell of the first-type network.

Optionally, the network device 600 may further include a fourth sending unit, configured to send a second message to a core network device, where the second message is used to indicate the terminal device to disconnect from a current network.

Optionally, the network device 600 may further include a third determining unit, configured to determine, based on first assistance information, that the cell of the first-type network exists around a coverage area of the first network device, where the first assistance information is historical network selection assistance information known to the first network device.

Figure 7:
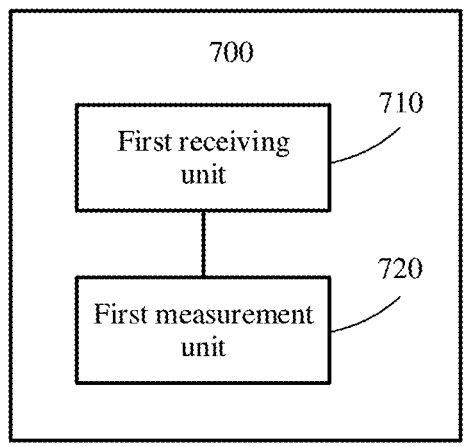
FIG. 7 is a schematic structural diagram of a terminal device according to an embodiment of this application.

FIG. 7 is a schematic structural diagram of a terminal device according to an embodiment of this application. A terminal device 700 shown in FIG. 7 may be corresponding to the terminal device described above. The terminal device 700 may include a first receiving unit 710 and a first measurement unit 720. The first receiving unit 710 may be configured to receive a first message sent by a first network device, where the first message includes a message that indicates the terminal device 700 to measure a cell of a first-type network. The first-type network is a selectable high-priority network of the terminal device 700, and a network provided by the first network device does not belong to the first-type network. The first measurement unit 720 may be configured to measure the cell of the first-type network. The terminal device may measure the first-type network by using measurement configuration information, where the measurement configuration information may be a first measurement GAP.

Optionally, the terminal device 700 may further include a first sending unit, configured to send first information to the first network device, where the first information is used to indicate the first-type network. The first information may include one or more of a network identifier ID, a cell frequency, a cell ID, a PLMN ID, a network type, a cell type, location information of the terminal device, a moving speed of the terminal device, a moving direction of the terminal device, and the like.

Optionally, the terminal device 700 may further include a second sending unit, configured to send request information to the first network device, where the request information may be used to request configuration information of the first measurement GAP.

Optionally, the terminal device 700 may further include a first determining unit, configured to determine that the terminal device 700 needs to access the first-type network or that the first-type network exists around a coverage area of the first network device.

Optionally, the terminal device 700 may further include a third sending unit, configured to send, to the first network device, a measurement result that is obtained by measuring the cell of the first-type network by the terminal device.

Optionally, the terminal device 700 may further include a second receiving unit, configured to receive a first indication message sent by the first network device, where the first indication message is used to indicate the terminal device to perform handover from a network cell in which the terminal device is currently located to the cell of the first-type network.

Optionally, the terminal device 700 may further include a first access unit, configured to hand over to the cell of the first-type network.

Optionally, the terminal device 700 may further include a third receiving unit, configured to receive a radio resource control RRC release message sent by the first network device, where the RRC release message carries a release cause, and the release cause indicates that the cell of the first-type network exists around the coverage area of the first network device.

Optionally, the terminal device 700 may further include a second access unit, configured to reselect the cell of the first-type network.

Optionally, the terminal device 700 may further include a fourth receiving unit, configured to receive a broadcast message sent by the first network device, where the broadcast message includes the first message.

Optionally, the terminal device 700 may further include a second determining unit, configured to determine, based on the first message, that the first-type network exists around the coverage area of the first network device.

Optionally, after the terminal device determines that the first-type network exists around the coverage area of the first network device, the terminal device accesses the cell of the first-type network.

Optionally, the terminal device 700 may further include a fourth sending unit, configured to send second information to a second network device in the first-type network, where the second information may include one or more of a type indication of a cell of the network device and/or a type indication of the first-type network, an ID of the cell of the network device and/or the ID of the first-type network, a cell ID of the cell of the network device and/or the cell ID of the first-type network, a cell frequency of the cell of the network device and/or the cell frequency of the first-type network, the PLMN, a geographical location of UE during network selection, and the like.

Optionally, the measurement performed by the terminal device on the cell of the first-type network includes: The terminal device measures signal quality of the cell of the first-type network and/or reads a broadcast message of the cell of the first-type network, where the broadcast message of the cell of the first-type network includes a master information block and/or a system information block.

Optionally, this embodiment of this application may further include a computer storage medium. The computer storage medium stores program code, and the program code is used to indicate to perform the foregoing network selection method.

Figure 8:
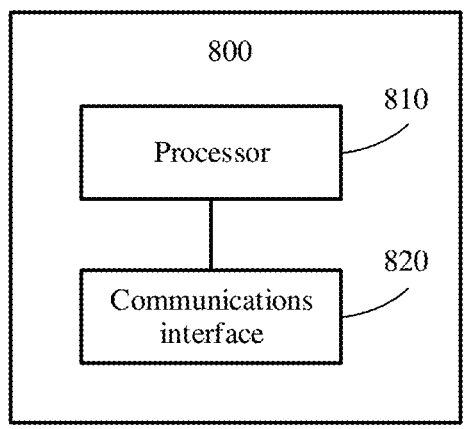
FIG. 8 is a schematic structural diagram of a communications device according to an embodiment of this application.

FIG. 8 is a schematic structural diagram of a communications device according to an embodiment of this application. A communications device 800 in FIG. 8 may be corresponding to the first network device or the terminal device described above. The communications device 800 may include at least one processor 810 and a communications interface 820. The communications interface 820 may be used by the communications device 800 to exchange information with another communications device. When program instructions are executed in the at least one processor 810, the communications device 800 is enabled to implement the foregoing steps, methods, operations, or functions performed by the first network device or the terminal device.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that such an implementation goes beyond the scope of this application.

It may be clearly understood by a person skilled in the art that, for the purpose of convenient and brief description, for a detailed operating process of the foregoing systems, devices, and units, refer to corresponding processes in the foregoing method embodiments, and details are not described herein again.

In the several embodiments provided in this application, it should be understood that the disclosed system, apparatus, and method may be implemented in other manners. For example, the described apparatus embodiment is merely an example. For example, during actual implementation, for some terminal devices in connected mode, a network device may send a multicast or multicast message that carries first-type network indication information, so that these terminal devices enable measurement on a cell of a first-type network.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   sending, by a first network device, a first message to a terminal device, wherein the first message comprises information indicating the existence of a first network to the terminal device the first network is a terrestrial network (TN), a network provided by the first network device is a non-terrestrial network (NTN), the first message is a broadcast message, and the terminal device is located in a cell covered by the first network device.

2. The method according to claim 1, wherein before sending, by the first network device, the first message to the terminal device, the method further comprises:
   determining, by the first network device a cell of the first network existing around the terminal device.

3. The method according to claim 2, wherein the terminal device is able to be handed over to or reselect the cell of the first network around a coverage area.

4. The method according to claim 1, wherein the first network is a high-priority network of the terminal device.

5. The method according to claim 1, wherein when the cell of the first network does not exist around the terminal device, the terminal device does not need to enable measurement.

6. A method, comprising:
receiving, by a terminal device, a first message sent by a first network device, wherein the first message comprises information indicating the existence of a first network to the terminal device, the first network is a terrestrial network (TN), a network provided by the first network device is a non-terrestrial network (NTN), the first message is a broadcast message, and the terminal device is located in a cell covered by the first network device; and
measuring, by the terminal device, a cell of the first network.

7. The method according to claim 6, wherein before receiving, by the terminal device, the first message sent by the first network device, the method further comprises:
sending, by the terminal device, first information to the first network device, wherein the first information indicates the cell of the first network.

8. The method according to claim 7, wherein the terminal device is able to be handed over to or reselect the cell of the first network around a coverage area.

9. The method according to claim 6, wherein the first network is a high-priority network of the terminal device.

10. The method according to claim 6, wherein when the cell of the first network does not exist around the terminal device, the terminal device does not need to enable measurement.

11. An apparatus applied to a first network device, the apparatus comprising:
one or more processors; and
a memory, wherein the memory stores a computer program, and when executing the computer program stored in the memory, the one or more processors execute operations comprising:
sending a first message to a terminal device, wherein the first message comprises information indicating the existence of a first network to the terminal device, the first network is terrestrial network (TN), a network provided by the first network device is a non-terrestrial network (NTN), the first message is a broadcast message, and the terminal device is located in a cell covered by the first network device.

12. The apparatus according to claim 11, wherein executing the computer program stored in the memory, the one or more processors execute operations further comprising:
before sending the first message to the terminal device,
determining a cell of the first network existing around the terminal device.

13. The apparatus according to claim 12, wherein the terminal device is able to be handed over to or reselect the cell of the first network around a coverage area.

14. The apparatus according to claim 11, wherein the first network is a high-priority network of the terminal device.

15. The apparatus according to claim 11, wherein when the cell of the first network does not exist around the terminal device, the terminal device does not need to enable measurement.

16. An apparatus applied to a terminal device, the apparatus comprising:
one or more processors; and
a memory, wherein the memory stores a computer program, and when executing the computer program stored in the memory, the one or more processors execute operations comprising:
receiving a first message sent by a first network device, wherein the first message comprises information indicating the existence of a first network to the terminal device, the first network is a terrestrial network (TN), a network provided by the first network device is a non-terrestrial network (NTN), the first message is a broadcast message, and the terminal device is located in a cell covered by the first network device; and
measuring a cell of the first network.

17. The apparatus according to claim 16, wherein when executing the computer program stored in the memory, the one or more processors execute operations further comprising:
before receiving the first message sent by the first network device, sending first information to the first network device, wherein the first information indicates the cell of the first network.

18. The apparatus according to claim 17, wherein the terminal device is able to be handed over to or reselect the cell of the first network around a coverage area.

19. The apparatus according to claim 16, wherein the first network is a high-priority network of the terminal device.

20. The apparatus according to claim 16, wherein when the cell of the first network does not exist around the terminal device, the terminal device does not need to enable measurement.

\* \* \* \* \*